Oct. 7, 1958   R. D. WASSERMAN ET AL   2,855,333
WELDING ELECTRODE
Filed June 7, 1955

INVENTORS
Rene D. Wasserman
and Joseph Quaas
BY
Connolly and Hutz
ATTORNEYS

United States Patent Office 2,855,333
Patented Oct. 7, 1958

2,855,333

WELDING ELECTRODE

Rene David Wasserman, Stamford, Conn., and Joseph Quaas, Island Park, N. Y., assignors to Eutectic Welding Alloys Corporation, Flushing, N. Y., a corporation of New York Application June 7, 1955, Serial No. 513,916

6 Claims. (Cl. 117—206)

This invention relates to an electrode for use in welding cast iron, and more particularly to a coated welding electrode for the aforementioned use.

Welding of cast iron offers many problems. Among these problems are difficulties encountered in depositing and cleaning the weld. The machinability of the finished weld must also be taken into consideration.

An object of this invention is to provide a coated electrode for welding cast iron which facilitates deposition of the weld metal.

Another object is to provide a coated electrode for welding cast iron which promotes machinability of the finished weld.

A further object is to provide a coated electrode for welding cast iron which eliminates the necessity of cleaning between passes.

In accordance with this invention, a conductive core of a type suitable for welding cast iron is coated with a flux composition. This flux composition includes an appreciable content of metallic powder having a 2 mil particle size or smaller. This particles size may also be described as 44 microns. By metallic powder is meant fine particles of a true metal or a metalloid such as silicon.

This powder content permits a rapid deposition of weld material. It also increases the fluidity and wetting ability of the molten weld metal. This flux coating furthermore provides a thin conductive slag in the molten and solidified state. Successive passes may, therefore, be welded without the necessity of chipping out slag or otherwise mechanically cleaning the deposited metal. The rapid deposition rate and concomitant reduction of the zone affected by the welding heat minimize the formation of brittle carbides in the cast iron weldment. This tends to increase the machinability of the finished weld.

A metallic arc electrode, which is an embodiment of this invention, includes a core of material which is suitable for welding cast iron. This core is therefore made, for example, of mild steel. The core may also be formed of an iron-nickel alloy or of pure nickel. A suitable mild steel, for example, is steel of the SAE 1010 type. A suitable iron-nickel alloy, for example, is a 55 nickel 45 iron type. Pure nickel of the type known as "Grade A" nickel, for example, may also be used.

A mild steel core tends to promote machinability. An iron-nickel alloy core tends to provide high weld strength and crack resistance, and a pure nickel core tends to promote workability.

Novel features and advantages of the present invention will become apparent to one skilled in the art from a reading of the following description in conjunction with the accompanying drawing wherein similar reference characters refer to similar parts and in which.

Figure 1:
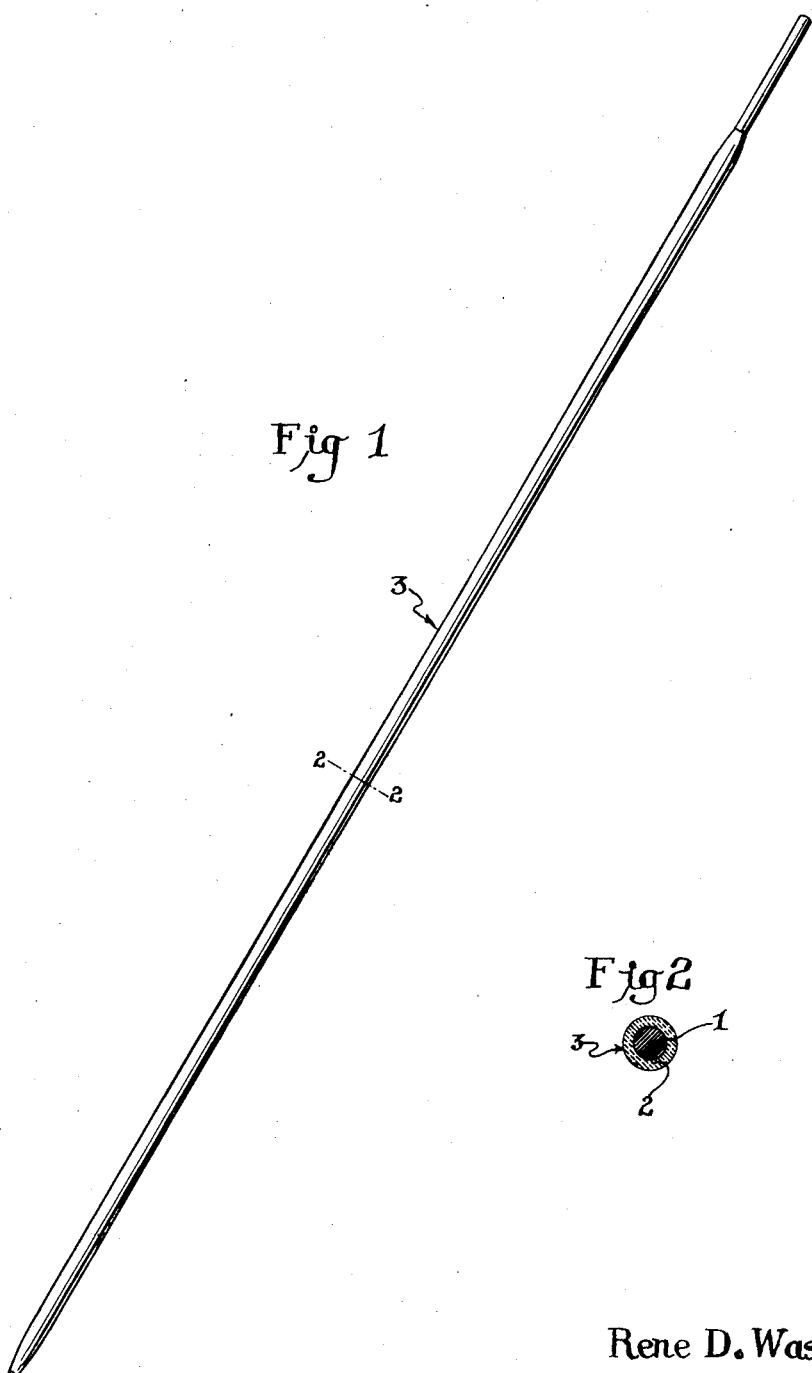
Fig. 1 is a perspective view of an embodiment of this invention.
Figure 2:
Fig. 2 is a cross-sectional view taken through Fig. 1 along the line 2—2.

In Figs. 1 and 2 is shown a coated welding rod 3 including, for example, a mild steel core 1 covered by a flux coating 2 whose formulation is derived in accordance with any of the specific examples set forth in the following.

The base formulation of the flux coating for this embodiment is somewhat similar to the base formulation of the flux described in U. S. Letters Patent 2,471,803. This present flux coating, however, includes a content of metallic powder of a relatively small particle size. This powder content is later described in detail. A formulation in accordance with the present invention consists of approximately 50% by weight of metallic powder and 50% by weight of arc stabilizers, slag formers and fluxing compounds. By metallic powder is meant fine particles of a true metal or a metalloid such as silicon. Illustrative formulation ranges and an example in percentages by weight are as follows:

| Constituent | Percent by Weight | |
|---|---|---|
| | Example | Range |
| Alkaline Earth Fluorides | 15 | 10 to 25 |
| Alkaline Earth Carbonates | 15 | 10 to 25 |
| Carbonaceous Material | 12 | 10 to 15 |
| Aluminum Silicate | 8 | 8 to 12 |
| Metallic Powder | 50 | 30 to 55 |

This metallic powder content has a particle size of 2 mils or smaller. This 2 mil particle size may be provided by passing the powder through a 325 mesh screen. 98% of the particles passing through the 325 mesh screen are finer than 44 microns, and 30% are finer than 37 microns.

This powder may be formulated, for example, from true metals such as nickel, copper, iron, columbium, titanium, aluminum, manganese, and alloys thereof; and it may also include a metalloid such as silicon. Other illustrative formulation ranges and another example of a coating in accordance with the present invention are as follows:

| Constituent | Percent by Weight | |
|---|---|---|
| | Example | Range |
| Calcium Fluoride | 15 | 10 to 20 |
| Calcium Carbonate | 10 | 5 to 15 |
| Strontium Carbonate | 5 | 5 to 10 |
| Graphite or Carbon | 12 | 10 to 20 |
| Aluminum Silicate | 8 | 5 to 9 |
| Ferro Silicon Powder | 20 | 10 to 30 |
| Iron Powder | 20 | 0 to 40 |
| Silicon Powder | 5 | 5 to 20 |
| Ferro Aluminum Powder | 5 | 0 to 15 |

These flux materials are held together or bonded with a suitable binder to permit manufacture by the dipping or extrusion process. Suitable application methods are described in aforementioned U. S. Letters Patent 2,471,803.

In the above example, the metallic powder content consists of the last four items which make up 50% by weight of the flux. The particle size of these powders is 2 mils or less which may be obtained by passing the powder through a 325 mesh screen.

Electrodes made in accordance with this invention have demonstrated a 20% faster burn-off rate and have deposited 20% more weld material in comparison to the same length of heretofore known cast iron welding electrodes.

Thick coatings of the flux of this present invention may be used without adversely affecting operation of the electrode. Coatings having a diameter of .210", for example, may accordingly be applied to ⅛" diameter core wire, in comparison to .160" diameter coatings usually applied to cast iron electrodes. The preponderance of metallic constituents imparts directive arc characteristics to the electrode which promotes ease of manipulation during deposition of the weld metal. This feature is extremely helpful, in view of the usual globular type of transfer of molten droplets experienced with cast iron electrodes previously in use.

Another advantage of the present invention is the freedom accorded for introducing various alloys or metals in the molten weld pool irrespective of the core material employed. A mild steel core of the SAE 1010 type can, therefore, be utilized with judicious quantities of silicon, columbium, and magnesium powders within a flux coating similar to that previously described. This provides a weld which has an extremely high machinability rating.

A pure nickel core material, coated with a flux having high percentages of silicon, nickel and/or iron powder, imparts easy workability to the weld metal.

An iron-nickel alloy core, preferably of the 55 nickel 45 iron type, coated with a flux coating including the high metallic powder content, set forth herein, deposits a weld of high strength and high crack resistance which is both machinable and X-ray sound.

An electrode coated in accordance with this invention provides a slag covering which is thin and conductive both in the molten and solidified state. This permits the welding operator to deposit weld metal with a puddle technique and to weld successive passes without the necessity of chipping out slag or mechanically cleaning the deposited metal therebetween. Considerable labor time spent in tedious slag removal is thereby eliminated.

What is claimed is:

1. An electrode for welding cast iron comprising a coated core, said core material being a substance selected from the group consisting of mild steel, and iron-nickel alloy and nickel, and the coating on said core including slag forming constituents and at least 30% by weight of metallic powder of a 44 micron particle size and smaller which floats in said slag to make it conductive.

2. An electrode for welding cast iron comprising a coated core, said core material being a substance selected from the group consisting of mild steel, and iron-nickel alloy and nickel, the coating on said core including slag forming constituents and between 30% and 55% of metallic powder of a 44 micron particle size and smaller which floats in said slag to make it conductive.

3. An electrode for welding cast iron comprising a coated core, said core material being a substance selected from the group consisting of mild steel, an iron-nickel alloy and nickel, and the coating on said core including by weight the following ranges of materials: 10 to 25% of alkaline earth fluorides, 10 to 25% of alkaline earth carbonates, 10 to 15% of carbonaceous material, 8 to 12% of aluminum silicate and 30 to 55% of metallic powder having a 44 micron particle size and smaller which floats in the slag formed by the aforementioned constituents to make it conductive.

4. An electrode for welding cast iron comprising a coated core, said core material being a substance selected from the group consisting of mild steel, an iron-nickel alloy and nickel, and the coating on said core including by weight 15% of alkaline earth fluorides, 15% of alkaline earth carbonates, 12% of carbonaceous material, 8% of aluminum silicate and 50% of metallic powder of a 44 micron particle size and smaller which floats in the slag formed by the aforementioned constituents to make it conductive.

5. An electrode for welding cast iron comprising a coated core, said core material being a substance selected from the group consisting of mild steel, an iron-nickel alloy and nickel, and the coating on said core including by weight the following ranges of materials: 10 to 20% of calcium fluoride, 5 to 15% of calcium carbonate, 5 to 10% of strontium carbonate, 10 to 20% of graphite, 5 to 9% of aluminum silicate, 10 to 30% of ferro silicon powder, 0 to 40% of iron powder, 5 to 20% of silicon powder, and 0 to 15% of ferro aluminum powder, and said powders being of a 44 micron particle size and smaller which floats in the slag formed by the aforementioned constituents to make it conductive.

6. An electrode for welding cast iron comprising a coated core, said core material being a substance selected from the group consisting of mild steel, an iron-nickel alloy and nickel, and the coating on said core including by weight 15% calcium fluoride, 10% calcium carbonate, 5% strontium carbonate, 12% graphite, 8% aluminum silicate, 20% ferro silicon powder, 20% iron powder, 5% silicon powder, and 5% ferro aluminum powder, and said powders being of a 44 micron particle size and smaller which floats in the slag formed by the aforementioned constituents to make it conductive.

References Cited in the file of this patent

UNITED STATES PATENTS

| | | |
|---|---|---|
| 2,009,240 | Roberts | July 23, 1935 |
| 2,366,473 | Blair | Jan. 2, 1945 |
| 2,471,803 | Wasserman | May 31, 1949 |
| 2,730,465 | Van der Willigen | Jan. 10, 1956 |